(12) United States Patent
Liu

(10) Patent No.: US 7,417,387 B2
(45) Date of Patent: Aug. 26, 2008

(54) DEVICE FOR GENERATING A MOTIVE FORCE

(75) Inventor: Yu-Ming Liu, Taichung (TW)

(73) Assignee: Te-En Liu, Taichung (TW)

( * ) Notice: Subject to any disclaimer, the term of this patent is extended or adjusted under 35 U.S.C. 154(b) by 137 days.

(21) Appl. No.: 11/639,071

(22) Filed: Dec. 14, 2006

(65) Prior Publication Data

US 2008/0144250 A1    Jun. 19, 2008

(51) Int. Cl.
*H02K 33/16* (2006.01)
(52) U.S. Cl. .................. 318/119; 318/126; 318/134
(58) Field of Classification Search ................ 318/114, 318/115, 119–134, 687, 725, 726
See application file for complete search history.

(56) References Cited

U.S. PATENT DOCUMENTS

| | | | | |
|---|---|---|---|---|
| 4,692,673 A | * | 9/1987 | DeLong | 318/132 |
| 4,965,864 A | * | 10/1990 | Roth et al. | 318/135 |
| 5,760,552 A | * | 6/1998 | Chen et al. | 318/122 |
| 6,891,287 B2 | * | 5/2005 | Moret | 310/36 |
| 2004/0251748 A1 | * | 12/2004 | Inagaki et al. | 310/14 |
| 2006/0028072 A1 | * | 2/2006 | Iwasa et al. | 310/14 |
| 2006/0131887 A1 | * | 6/2006 | Gosvener | 290/1 R |

* cited by examiner

*Primary Examiner*—Bentsu Ro
(74) *Attorney, Agent, or Firm*—Curatolo Sidoti Co., LPA; Joseph G. Curatolo; Salvatore A. Curatolo

(57) ABSTRACT

A device for generating a motive force includes a tubular housing, a driving member, and a magnetic unit. The driving member is movably disposed in the tubular housing and includes a magnet. The magnetic unit includes first and second magnets, each of which covers a respective one of first and second open ends of the tubular housing. The construction as such permits alternate reversal of a polarity of a magnetic field of the magnet of the driving member to cause reciprocating movement of the driving member in the tubular housing.

7 Claims, 5 Drawing Sheets

DEVICE FOR GENERATING A MOTIVE FORCE

BACKGROUND OF THE INVENTION

1. Field of the Invention

This invention relates to a device for generating a motive force, more particularly to a device for generating a motive force using electrical energy.

2. Description of the Related Art

A conventional device for generating a motive force involves the use of fuel, which is relatively expensive. It has been proposed heretofore to use electric motors. While numerous electric motors of a conventional type have been proposed in the art, the existing electric motors, particularly those used in motor vehicles, are undesirably bulky and heavy.

SUMMARY OF THE INVENTION

Therefore, the object of the present invention is to provide a device for generating a motive force that can overcome the aforesaid drawbacks of the prior art.

According to the present invention, a device for generating a motive force comprises a tubular housing, a driving member, and a magnetic unit. The tubular housing has opposite first and second open ends. The driving member is movably disposed in the tubular housing and includes a magnet. The driving member is movable relative to the tubular housing between first and second positions that are respectively proximate to the first and second open ends of the tubular housing. The magnetic unit includes first and second magnets, each of which covers a respective one of the first and second open ends of the tubular housing. When the driving member moves to the first position, a polarity of a magnetic field of one of the magnet of the driving member and the magnetic unit is reversed such that the first magnet repels and the second magnet attracts the magnet of the driving member, thereby causing movement of the driving member to the second position. When the driving member moves to the second position, the polarity of the magnetic field of said one of the magnet of the driving member and the magnetic unit is reversed such that the second magnet repels and the first magnet attracts the magnet of the driving member, thereby causing movement of the driving member to the first position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
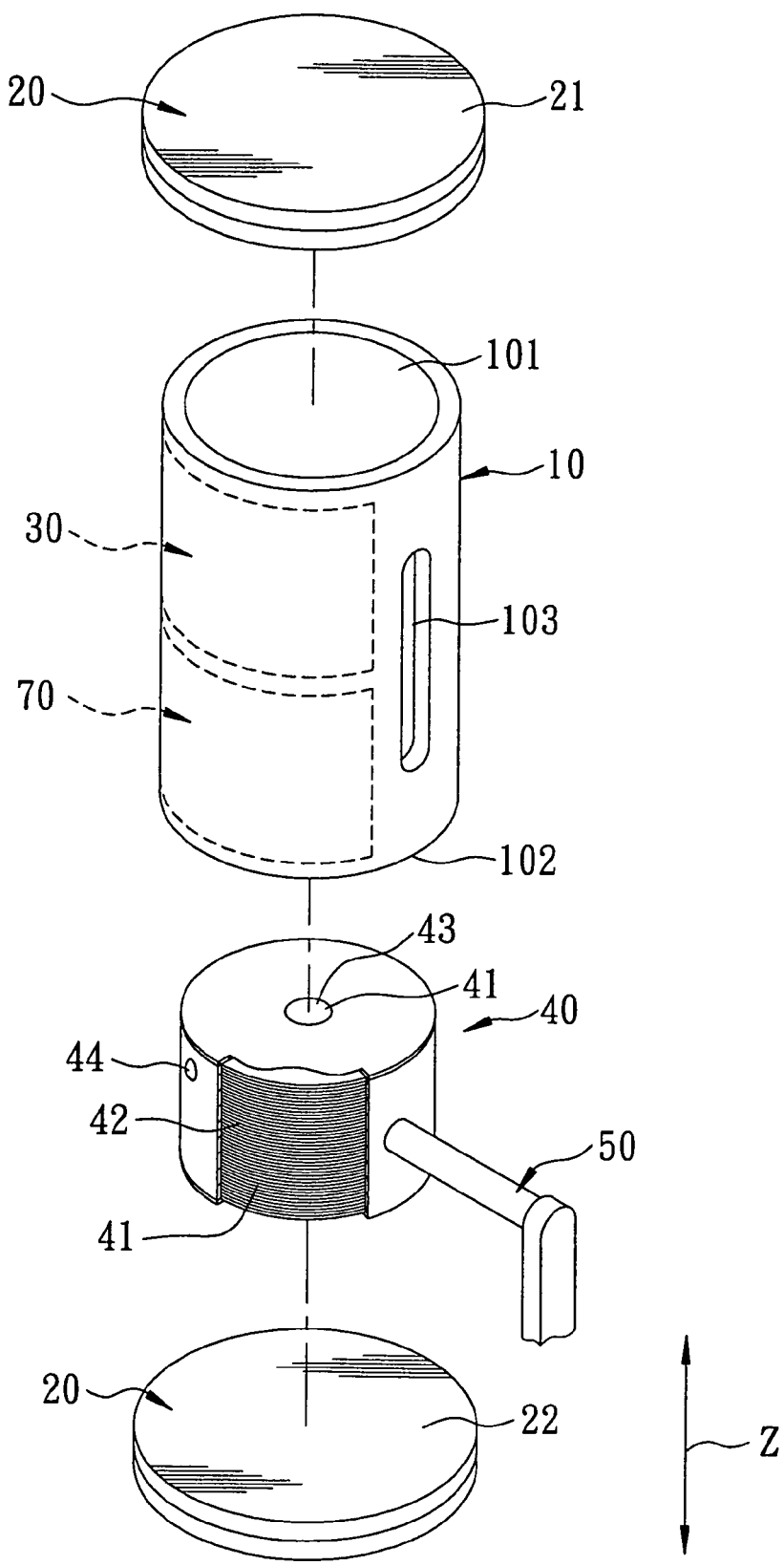
FIG. 1 is an exploded perspective view of the first preferred embodiment of a device for generating a motive force according to this invention.

Before the present invention is described in greater detail, it should be noted that like elements are denoted by the same reference numerals throughout the disclosure.

Figure 2:
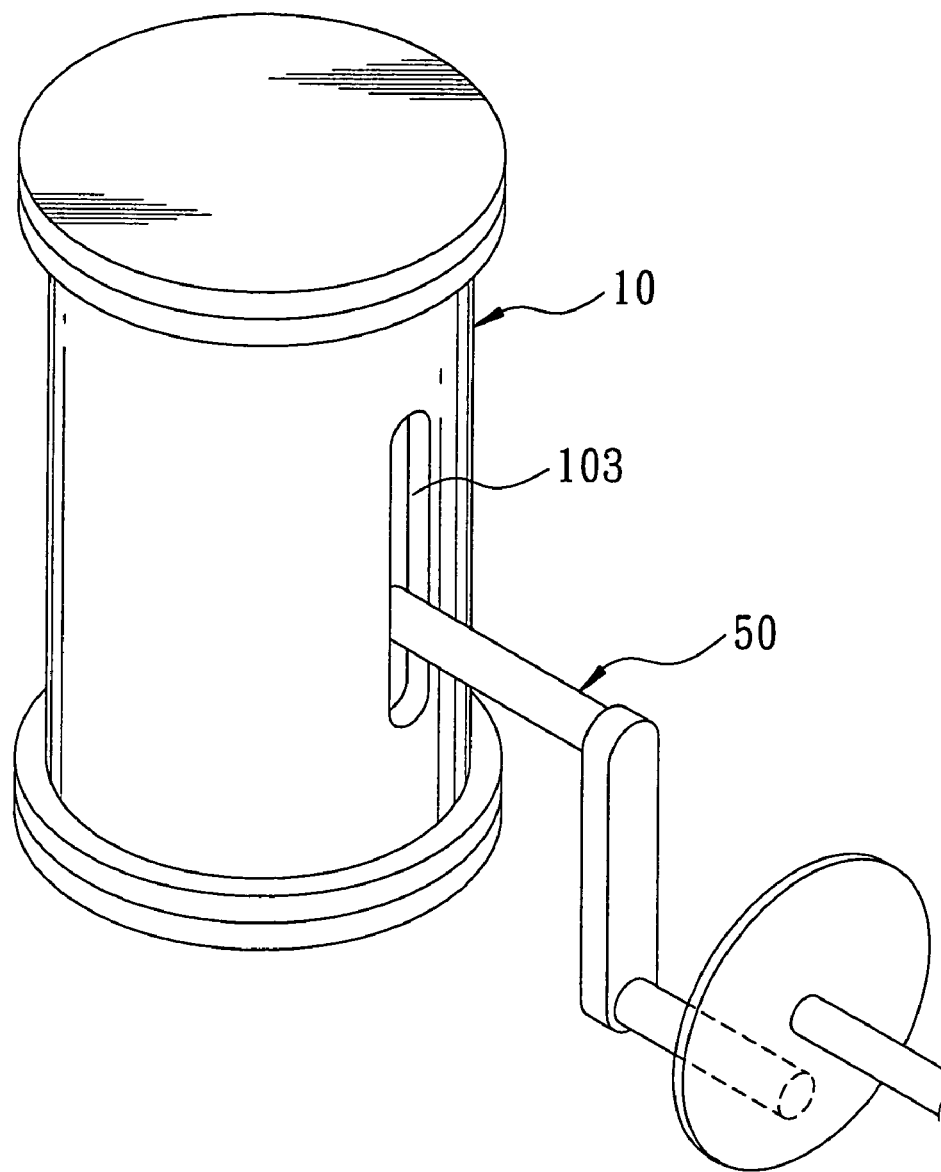
FIG. 2 is a perspective view of the first preferred embodiment in an assembled state.
Figure 3:
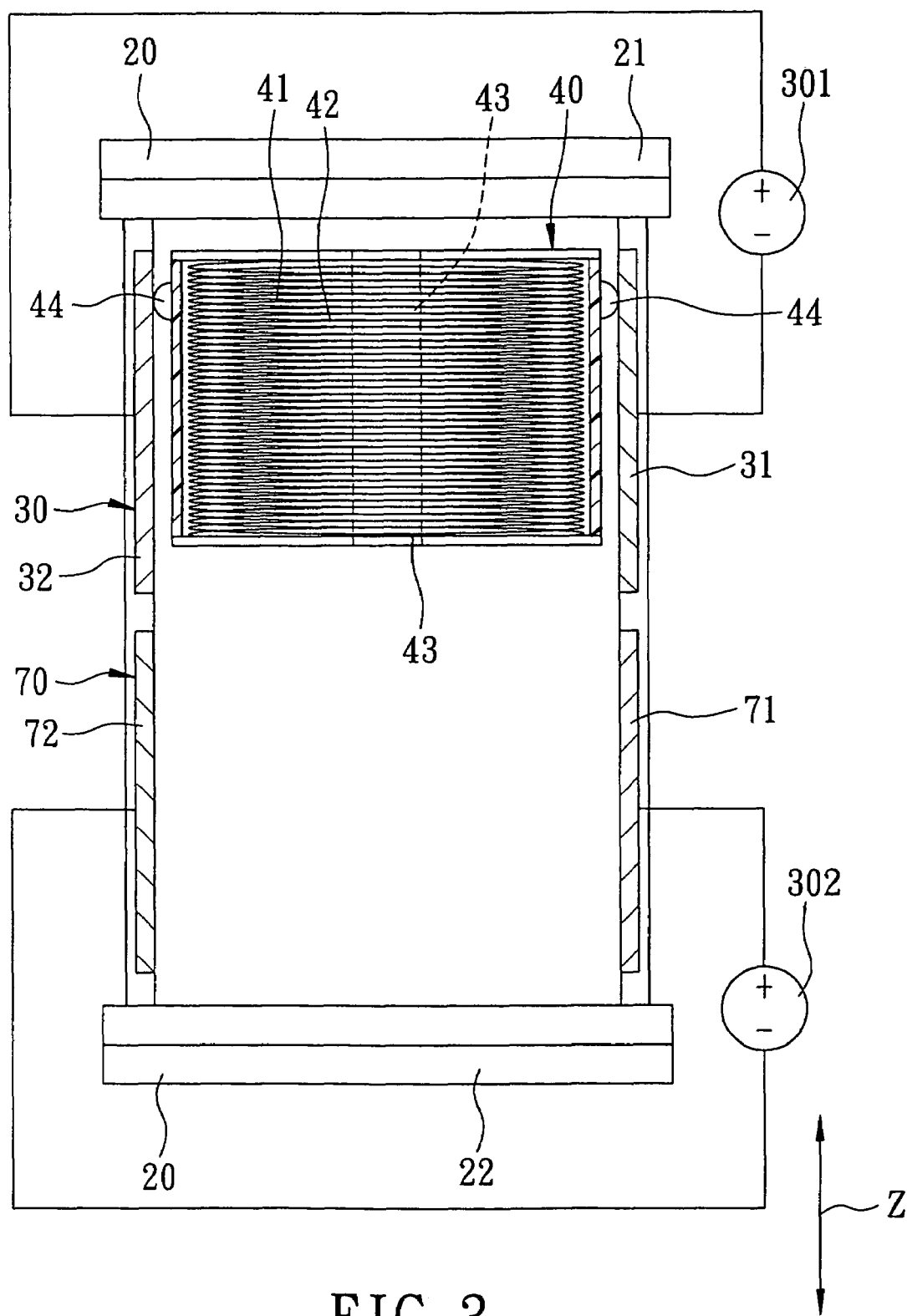
FIG. 3 is a partly sectional view of the first preferred embodiment in a state of use.

Referring to FIGS. 1 to 3, the first preferred embodiment of a device for generating a motive force according to the present invention includes a tubular housing 10, a driving member 40, a magnetic unit 20, a first electrical contact unit 30, a second electrical contact unit 70, and a driven member 50.

The tubular housing 10 of the device has first and second open ends 101, 102 that are opposite to each other in a longitudinal direction, as indicated by arrow (Z).

The driving member 40 is disposed movably in the tubular housing 10, includes a magnet 41, and is movable relative to the tubular housing 10 between first and second positions that are respectively proximate to the first and second open ends 101, 102 of the tubular housing 10. In this embodiment, the magnet 41 of the driving member 40 is an electromagnet, and includes an iron core 43, and a wire 42 coiled around the iron core 43.

The driving member 40 further includes a pair of contact members 44, each of which is connected to a respective one of opposite ends of the wire 42 of the magnet 41 of the driving member 40.

The magnetic unit 20 includes first and second magnets 21, 22, each of which covers a respective one of the first and second open ends 101, 102 of the tubular housing 10 such that a side of the first magnet 21 that faces the driving member 40 has the same polarity as that of a side of the second magnet 22 that faces the driving member 40. In this embodiment, each of the first and second magnets 21, 22 of the magnetic unit 20 is a permanent magnet. In an alternative embodiment, each of the first and second magnets 21, 22 of the magnetic unit 20 is an electromagnet.

The first electrical contact unit 30 includes first and second contact pads 31, 32, is attached to an inner wall of the tubular housing 10, and is disposed in the tubular housing 10 proximate to the first open end 101 of the tubular housing 10. As best shown in FIG. 3, the first contact pad 31 of the first electrical contact unit 30 is connected to a negative terminal of a first electric power source 301, whereas the second contact pad 32 of the first electrical contact unit 30 is connected to a positive terminal of the first electric power source 301.

The second electrical contact unit 70 includes first and second contact pads 71, 72, is attached to the inner wall of the tubular housing 10, and is disposed in the tubular housing 10 proximate to the second open end 102 of the tubular housing 10 such that each of the first and second contact pads 71, 72 of the second electrical contact unit 70 is opposite to a respective one of the first and second contact pads 31, 32 of the first electrical contact unit 30 in the longitudinal direction (Z). As best shown in FIG. 3, the first contact pad 71 of the second electrical contact unit 70 is connected to a positive terminal of a second electric power source 302, whereas the second contact pad 72 of the second electrical contact unit 70 is connected to a negative terminal of the second electric power source 302.

In this embodiment, the tubular housing 10 is formed with an elongated through-hole 103 that extends in the longitudinal direction (Z). The device further includes a driven member 50 that extends into the tubular housing 10 through the elongated through-hole 103 in the tubular housing 10, and that is connected to and co-movable with the driving member 40. The construction as such permits imparting of the motive force generated by the device through the driven member 50.

In operation, when the driving member 40 moves to the first position, the magnet 41 of the driving member 40, through the contact members 44 of the driving member 40, establishes an electrical connection with the first and second contact pads 31, 32 of the first electrical contact unit 30. At this time, a polarity of a magnetic field of the magnet 41 of the driving member 40 is reversed such that the first magnet 21 repels and the second magnet 22 attracts the magnet 41 of the driving member 40, thereby causing movement of the driving member 40 to the second position. When the driving member 40 moves to the second position, the magnet 41 of the driving member 40, through the contact members 44 of the driving member 40, establishes an electrical connection with the first and second contact pads 71, 72 of the second electrical contact unit 70. At this time, the polarity of the magnetic field of the magnet 41 of the driving member 40 is reversed such that the second magnet 22 repels and the first magnet 21 attracts the magnet 41 of the driving member 40, thereby causing movement of the driving member 40 to the first position. Thereafter, the operation is repeated.

Figure 4:
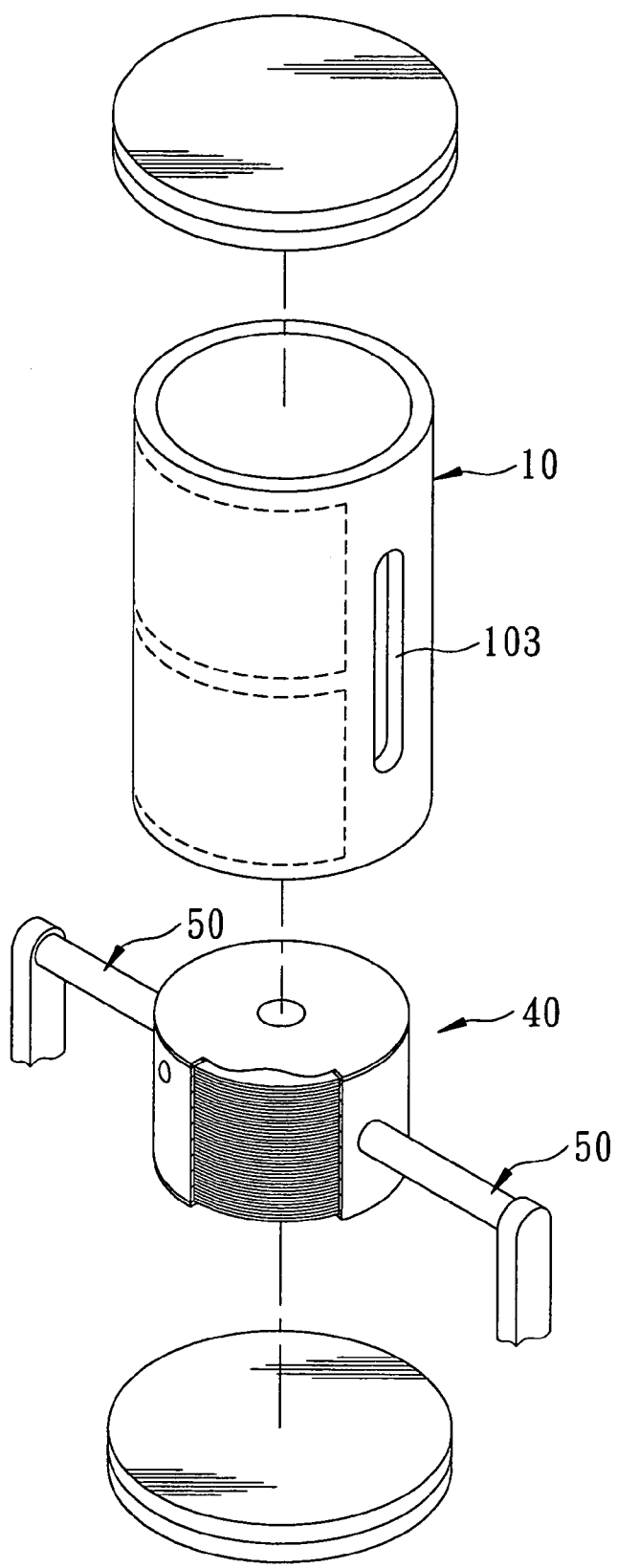
FIG. 4 is an exploded perspective view of the second preferred embodiment of a device for generating a motive force according to this invention.

FIG. 4 illustrates the second preferred embodiment of a device for generating a motive force according to this invention. When compared to the previous embodiment, the tubular housing 10 is formed with a pair of the elongated through-holes 103 (only one of the elongated through-holes 103 is shown in FIG. 4). In this case, the device includes a pair of the driven members 50, each of which extends into the tubular housing 10 through a respective one of the elongated through-holes 103 in the tubular housing 10 and is connected to and co-movable with the driving member 40.

Figure 5:
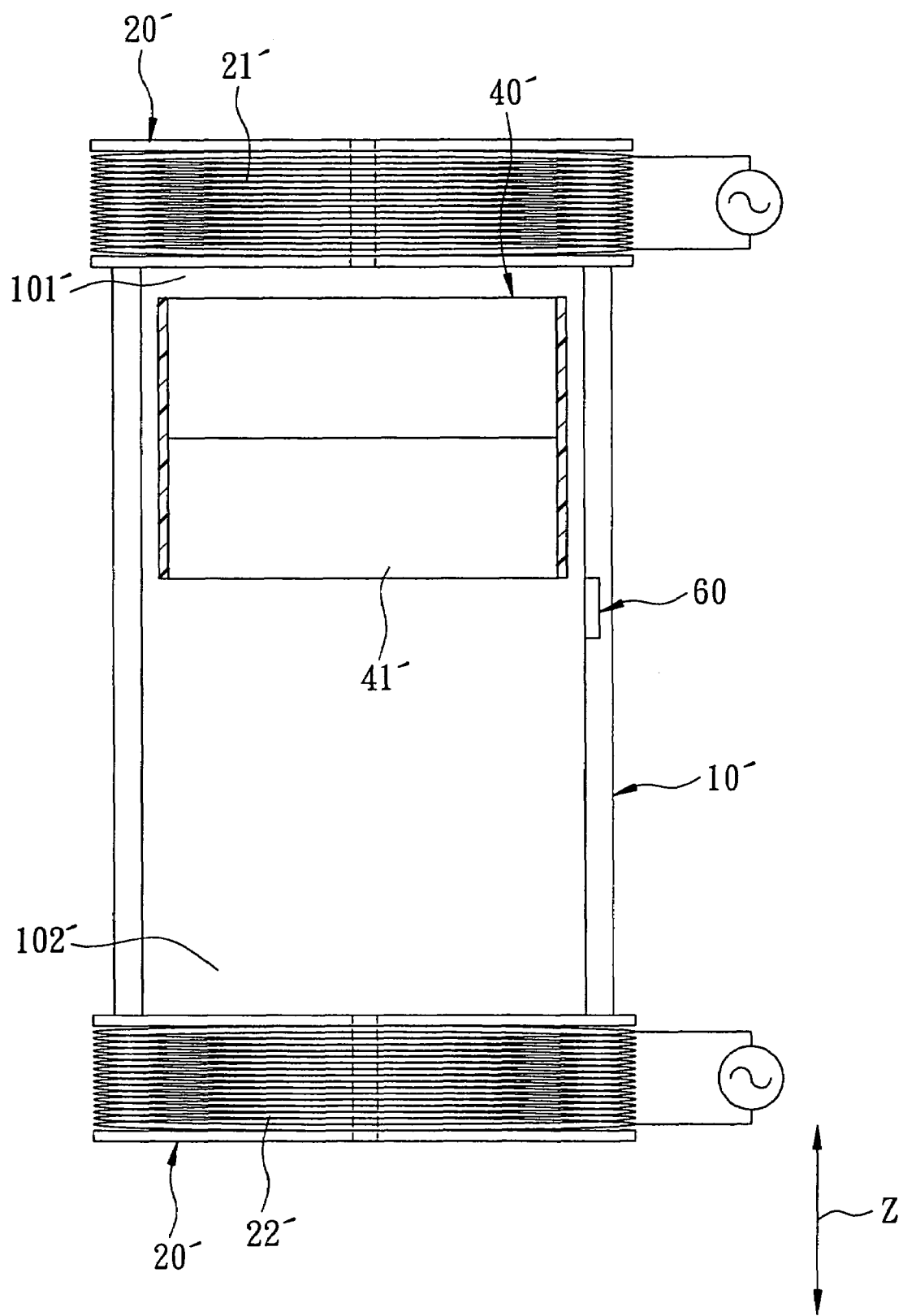
FIG. 5 is a partly sectional view of the third preferred embodiment of a device for generating a motive force according to this invention.

FIG. 5 illustrates the third preferred embodiment of a device for generating a motive force according to this invention. When compared to the previous embodiments, the device includes a tubular housing 10', a driving member 40', a sensor 60, and a magnetic unit 20'.

The tubular housing 10' has first and second open ends 101', 102' that are opposite to each other in a longitudinal direction, as indicated by arrow (Z).

The driving member 40' is disposed movably in the tubular housing 10', includes a magnet 41', and is movable relative to the tubular housing 10' between first and second positions that are respectively proximate to the first and second open ends 101', 102' of the tubular housing 10'. In this embodiment, the magnet 41' of the driving member 40' is a permanent magnet.

The sensor 60 is disposed in the tubular housing 10' at a position between the first and second open ends 101', 102' of the tubular housing 10', and is operable so as to detect a magnetic field of the magnet 41' of the driving member 40' and so as to generate an electrical signal, i.e., a voltage, that corresponds to the magnetic field detected thereby. In this embodiment, the sensor 60 may be a Hall sensor or a wire-wound sensor.

The magnetic unit 20' includes first and second magnets 21', 22', each of which covers a respective one of the first and second open ends 101', 102' of the tubular housing 10' and is coupled to the sensor 60 for receiving the electrical signal generated by the sensor 60 to result in reversal of the polarities of the magnetic fields of the first and second magnets 21', 22'. In this embodiment, each of the first and second magnets 21' 22' of the magnetic unit 20' is an electromagnet.

In operation, when the driving member 40' moves to the first position, the sensor 60 detects the magnetic field of the magnet 41' of the driving member 40', and generates an electrical signal that corresponds to the magnetic field detected thereby. In response to the electrical signal generated by the sensor 60, a polarity of the magnetic field of each of the first and second magnets 21', 22' is reversed such that the first magnet 21' repels and the second magnet 22' attracts the magnet 41' of the driving member 40', thereby causing movement of the driving member 40' to the second position. When the driving member 40' moves to the second position, the sensor 60 detects the magnetic field of the magnet 41' of the driving member 40', and generates an electrical signal that corresponds to the magnetic field detected thereby. In response to the electrical signal generated by the sensor 60, the polarity of the magnetic field of each of the first and second magnets 21', 22' is reversed such that the second magnet 22' repels and the first magnet 21' attracts the magnet 41' of the driving member 40', thereby causing movement of the driving member 40' to the first position. Thereafter, the operation is repeated.

From the above description, the device of this invention, as compared to conventional electric motors built from stators and rotors, uses the magnets 21, 21', 22, 22', 41, 41' to cause reciprocating movement of the driving member 40, 40' between the first and second positions, thereby resulting in a simple, low cost, and light weight motive force generating structure suited for application to motor vehicles.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A device for generating a motive force, comprising:
   a tubular housing having opposite first and second open ends;
   a driving member movably disposed in said tubular housing, and including a magnet, said driving member being movable relative to said tubular housing between first and second positions that are respectively proximate to said first and second open ends of said tubular housing; and
   a magnetic unit including first and second magnets, each of which covers a respective one of said first and second open ends of said tubular housing;
   wherein a polarity of a magnetic field of one of said magnet of said driving member and said magnetic unit is reversed when said driving member moves to the first position such that said first magnet repels and said second magnet attracts said magnet of said driving member, thereby causing movement of said driving member to the second position; and
   wherein the polarity of the magnetic field of said one of said magnet of said driving member and said magnetic unit is reversed when said driving member moves to the second position such that said second magnet repels and said first magnet attracts said magnet of said driving member, thereby causing movement of said driving member to the first position.

2. The device as claimed in claim 1, wherein said magnet of said driving member is an electromagnet, said device further comprising:
   a first electrical contact unit disposed in said tubular housing and adapted to be connected to a first electric power source, said magnet of said driving member establishing an electrical connection with said first electrical contact unit when said driving member moves to the first position to result in the reversal of the polarity of the magnetic field of said magnet of said driving member; and
   a second electrical contact unit disposed in said tubular housing and adapted to be connected to a second electric power source, said magnet of said driving member establishing an electrical connection with said second electrical contact unit when said driving member moves to the second position to result in the reversal of the polarity of the magnetic field of said magnet of said driving member.

3. The device as claimed in claim 2, wherein said magnet of said driving member includes an iron core, and a wire that is coiled on said iron core, said driving member further including a pair of contact members, each of which is connected to a respective one of opposite ends of said wire, said magnet of said driving member establishing the electrical connection with said first and second electrical contact units through said contact members.

4. The device as claimed in claim 2, wherein each of said first and second magnets is a permanent magnet.

5. The device as claimed in claim 1, wherein each of said first and second magnets of said magnetic unit is an electromagnet, said device further comprising a sensor disposed on said tubular housing, and operable so as to detect the magnetic field of said magnet of said driving member, each of said first and second magnets of said magnetic unit being coupled to said sensor for receiving the electrical signal generated by said sensor to result in the reversal of the polarities of the magnetic field of said first and second magnets in response to the electrical signal from said sensor.

6. The device as claimed in claim 5, wherein said magnet of said driving member is a permanent magnet.

7. The device as claimed in claim 1, further comprising a driven member extending into said tubular housing, and connected to and co-movable with said driving member.

* * * * *